3,686,224
2,6,7-TRIOXABICYCLO[2.2.2]OCTANE COMPOUNDS
John F. Deffner, Glenshaw, Pa., assignor to Gulf Research & Development Company, Pittsburgh, Pa.
No Drawing. Filed Feb. 24, 1970, Ser. No. 13,828
Int. Cl. C07d 19/00
U.S. Cl. 260—340.7
3 Claims

ABSTRACT OF THE DISCLOSURE

Novel derivatives of 2,6,7-trioxabicyclo [2.2.2]octane useful as herbicides are represented by the general formula

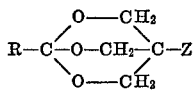

wherein R can be hydrogen, alkyl, aryl, aralkyl, alkaryl, cycloalkyl and fluoromethyl radicals; and Z can be amino, acetamido, benzamido, nitrobenzamido, chlorobenzamido, alkylureido, arylureido and ammonium fluoroacetate radicals. Examples include 1-methyl-4-amino-2,6,7-trioxabicyclo[2.2.2]octane
1-trifluoromethyl-2,6,7-trioxabicyclo[2.2.2]octyl-4-ammonium trifluoroacetate
N-(N'-methylcarbamyl)-4-amino-1-methyl-2,6,7-trioxabicyclo[2.2.2]octane
1-methyl-4-benzamido-2,6,7-trioxabicyclo[2.2.2]octane
1-methyl-4-(p-nitrobenzamido)-2,6,7-trioxabicyclo [2.2.2]octane
1-methyl-4-(2',4'-dichlorobenzamido)-2,6,7-trioxabicyclo[2.2.2]octane

---

This invention relates to certain novel derivatives of 2,6,7-trioxabicyclo[2.2.2]octane which are useful as pesticides including particularly herbicides.

The derivatives of 2,6,7-trioxabicyclo[2.2.2]octane of this invention are represented by the formula

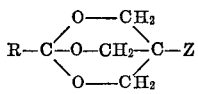

wherein R is selected from the group consisting of hydrogen; alkyl[$C_nH_{2n+1}$—]; aryl[$C_6H_5$—; $C_{10}H_7$—]; aralkyl[$C_6H_5(CH_2)_n$—]; alkaryl[$CH_3C_6H_4$—;

$(CH_3)_2C_6H_3$—]

cycloalkyl[$C_mH_{2m-1}$—]; and fluoromethyl[$F_xCH_{3-x}$—] radicals; Z is selected from the group consisting of amino[$NH_2$—]; acetamido [$CH_6H_5CONH$—];

benzamido[$C_6H_5CONH$—];

nitrobenzamido[$(NO_2)_xC_6H_{5-x}CONH$—];

chlorobenzamido[$(Cl)_xC_6H_{5-x}CONH$—];

alkylureido[$C_nH_{2n+1}NHCONH$—];

arylureido[$C_6H_5NHCONH$—;

$C_{10}H_7NHCONH$—]; and ammonium fluoroacetate[$NH_3^{(+)}O_2CCH_{3-x}F_x^{(-)}$—]

radicals; $m$ is an integer of 3 to 8; $n$ is an integer of 1 to 8; and $x$ is an integer of 1 to 3.

Specific examples of compounds of the invention are:

4-amino-2,6,7-trioxabicyclo[2.2.2]octane
1-methyl-4-amino-2,6,7-trioxabicyclo[2.2.2]octane
1-ethyl-4-amino-2,6,7-trioxabicyclo[2.2.2]octane
1-propyl-4-amino-2,6,7-trioxabicyclo[2.2.2]octane
1-n-butyl-4-amino-2,6,7-trioxabicyclo[2.2.2]octane
1-tert-butyl-4-amino-2,6,7-trioxabicyclo[2.2.2]octane
1-n-amyl-4-amino-2,6,7-trioxabicyclo[2.2.2]octane
1-isoamyl-4-amino-2,6,7-trioxabicyclo[2.2.2]octane
1-n-hexyl-4-amino-2,6,7-trioxabicyclo[2.2.2]octane
1-isohexyl-4-amino-2,6,7-trioxabicyclo[2.2.2]octane
1-n-heptyl-4-amino-2,6,7-trioxabicyclo[2.2.2]octane
1-n-octyl-4-amino-2,6,7-trioxabicyclo[2.2.2]octane
1-isooctyl-4-amino-2,6,7-trioxabicyclo[2.2.2]octane
1-phenyl-4-amino-2,6,7-trioxabicyclo[2.2.2]octane
1-naphthyl-4-amino-2,6,7-trioxabicyclo[2.2.2]octane
1-benzyl-4-amino-2,6,7-trioxabicyclo[2.2.2]octane
1-phenethyl-4-amino-2,6,7-trioxabicyclo[2.2.2]octane
1-tolyl-4-amino-2,6,7-trioxabicyclo[2.2.2]octane
1-xylyl-4-amino-2,6,7-trioxabicyclo[2.2.2]octane
1-cyclohexyl-4-amino-2,6,7-trioxabicyclo[2.2.2]octane
1-methyl-4-acetamido-2,6,7-trioxabicyclo[2.2.2]octane
1-isooctyl-4-acetamido-2,6,7-trioxabicyclo[2.2.2]octane
1-phenyl-4-acetamido-2,6,7-trioxabicyclo[2.2.2]octane
1-benzyl-4-acetamido-2,6,7-trioxabicyclo[2.2.2]octane
1-cyclohexyl-4-acetamido-2,6,7-trioxabicyclo[2.2.2]octane
1-methyl-4-benzamido-2,6,7-trioxabicyclo[2.2.2]octane
1-isooctyl-4-benzamido-2,6,7-trioxabicyclo[2.2.2]octane
1-phenyl-4-benzamido-2,6,7-trioxabicyclo[2.2.2]octane
1-benzyl-4-benzamido-2,6,7-trioxabicyclo[2.2.2]octane
1-cyclohexyl-4-benzamido-2,6,7-trioxabicyclo[2.2.2]octane
1-methyl-4-(p-nitrobenzamido)-2,6,7-trioxabicyclo [2.2.2]octane
1-isooctyl-4-(p-nitrobenzamido)-2,6,7-trioxabicyclo [2.2.2]octane
1-phenyl-4-(p-nitrobenzamido)-2,6,7-trioxabicyclo- [2.2.2.]octane
1-benzyl-4-(p-nitrobenzamido)-2,6,7-trioxabicyclo[2.2.2] octane
1-cyclohexyl-4-(p-nitrobenzamido)-2,6,7-trioxabicyclo [2.2.2]octane
1-methyl-4-(2',4'-dinitrobenzamido)-2,6,7-trioxabicyclo- [2.2.2]octane
1-isooctyl-4-(2',4'-dinitrobenzamido)-2,6,7-trioxabicyclo- [2.2.2]octane
1-phenyl-4-(2',4'-dinitrobenzamido)-2,6,7-trioxabicyclo- [2.2.2]octane
1-benzyl-4-(2',4'-dinitrobenzamido)-2,6,7-trioxabicyclo- [2.2.2]octane
1-cyclohexyl-4-(2',4'-dinitrobenzamido)-2,6,7-trioxabicyclo[2.2.2]octane
1-methyl-4-(p-chlorobenzamido)-2,6,7-trioxabicyclo- [2.2.2]octane
1-isooctyl-4-(p-chlorobenzamido)-2,6,7-trioxabicyclo- [2.2.2]octane
1-phenyl-4-(p-chlorobenzamido)-2,6,7-trioxabicyclo- [2.2.2]octane
1-benzyl-4-(p-chlorobenzamido)-2,6,7-trioxabicyclo- [2.2.2]octane
1-cyclohexyl-4-(p-chlorobenzamido)-2,6,7-trioxabicyclo- [2.2.2]octane
1-methyl-4-(2',4'-dichlorobenzamido)-2,6,7-trioxabicyclo- [2.2.2]octane
1-isooctyl-4-(2',4'-dichlorobenzamido)-2,6,7-trioxabicyclo[2.2.2]octane
1-phenyl-4-(2',4'-dichlorobenzamido)-2,6,7-trioxabicyclo[2.2.2]octane
1-benzyl-4-(2',4'-dichlorobenzamido)-2,6,7-trioxabicyclo[2.2.2]octane
1-cyclohexyl-4-(2',4'-dichlorobenzamido)-2,6,7-trioxabicyclo[2.2.2]octane
N-(N'-methylcarbamyl)-4-amino-1-methyl-2,6,7-trioxabicyclo[2.2.2]octane
N-(N'-ethylcarbamyl)-4-amino-1-methyl-2,6,7-trioxabicyclo[2.2.2]octane N-(N'-propylcarbamyl)-4-amino-1-methyl-2,6,7-trioxabicyclo[2.2.2]octane
N-(N'-butylcarbamyl)-4-amino-1-methyl-2,6,7-trioxabicyclo[2.2.2]octane
N-(N'-hexylcarbamyl)-4-amino-1-methyl-2,6,7-trioxabicyclo[2.2.2]octane
N-(N'-octylcarbamyl)-4-amino-1-methyl-2,6,7-trioxabicyclo[2.2.2]octane
N-(N'-methylcarbamyl)-4-amino-1-isooctyl-2,6,7-trioxabicyclo[2.2.2]octane
N-(N'-ethylcarbamyl)-4-amino-1-isooctyl-2,6,7-trioxabicyclo[2.2.2]octane
N-(N'-propylcarbamyl)-4-amino-1-isooctyl-2,6,7-trioxabicyclo[2.2.2]octane
N-(N'-butylcarbamyl)-4-amino-1-isooctyl-2,6,7-trioxabicyclo[2.2.2]octane
N-(N'-hexylcarbamyl)-4-amino-1-isooctyl-2,6,7-trioxabicyclo[2.2.2]octane
N-(N'-octylcarbamyl)-4-amino-1-isooctyl-2,6,7-trioxabicyclo[2.2.2]octane
N-(N'-methylcarbamyl)-4-amino-1-phenyl-2,6,7-trioxabicyclo[2.2.2]octane
N-(N'-ethylcarbamyl)-4-amino-1-phenyl-2,6,7-trioxabicyclo[2.2.2]octane
N-(N'-propylcarbamyl)-4-amino-1-phenyl-2,6,7-trioxabicyclo[2.2.2]octane
N-(N'-butylcarbamyl)-4-amino-1-phenyl-2,6,7-trioxabicyclo[2.2.2]octane
N-(N'-hexylcarbamyl)-4-amino-1-phenyl-2,6,7-trioxabicyclo[2.2.2]octane
N-(N'-octylcarbamyl)-4-amino-1-phenyl-2,6,7-trioxabicyclo[2.2.2]octane
N-(N'-methylcarbamyl)-4-amino-1-benzyl-2,6,7-trioxabicyclo[2.2.2]octane
N-(N'-ethylcarbamyl)-4-amino-1-benzyl-2,6,7-trioxabicyclo[2.2.2]octane
N-(N'-propylcarbamyl)-4-amino-1-benzyl-2,6,7-trioxabicyclo[2.2.2]octane
N-(N'-butylcarbamyl)-4-amino-1-benzyl-2,6,7-trioxabicyclo[2.2.2]octane
N-(N'-hexylcarbamyl)-4-amino-1-benzyl-2,6,7-trioxabicyclo[2.2.2]octane
N-(N'-octylcarbamyl)-4-amino-1-benzyl-2,6,7-trioxabicyclo[2.2.2]octane
N-(N'-methylcarbamyl)-4-amino-1-cyclohexyl-2,6,7-trioxabicyclo[2.2.2]octane
N-(N'-ethylcarbamyl)-4-amino-1-cyclohexyl-2,6,7-trioxabicyclo[2.2.2]octane
N-(N'-propylcarbamyl)-4-amino-1-cyclohexyl-2,6,7-trioxabicyclo[2.2.2]octane
N-(N'-butylcarbamyl)-4-amino-1-cyclohexyl-2,6,7-trioxabicyclo[2.2.2]octane
N-(N'-hexylcarbamyl)-4-amino-1-cyclohexyl-2,6,7-trioxabicyclo[2.2.2]octane
N-(N'-octylcarbamyl)-4-amino-1-cyclohexyl-2,6,7-trioxabicyclo[2.2.2]octane
1-methyl-4-phenylureido-2,6,7-trioxabicyclo[2.2.2]octane
1-isooctyl-4-phenylureido-2,6,7-trioxabicyclo[2.2.2]octane
1-phenyl-4-phenylureido-2,6,7-trioxabicyclo[2.2.2]octane
1-benzyl-4-phenylureido-2,6,7-trioxabicyclo[2.2.2]octane
1-cyclohexyl-4-phenylureido-2,6,7-trioxabicyclo[2.2.2]octane
1-methyl-4-naphthylureido-2,6,7-trioxabicyclo[2.2.2]octane
1-isooctyl-4-naphthylureido-2,6,7-trioxabicyclo[2.2.2]octane
1-phenyl-4-naphthylureido-2,6,7-trioxabicyclo[2.2.2]octane
1-benzyl-4-naphthylureido-2,6,7-trioxabicyclo[2.2.2]octane
1-cyclohexyl-4-naphthylureido-2,6,7-trioxabicyclo[2.2.2]octane
1-fluoromethyl-2,6,7-trioxabicyclo[2.2.2]octyl-4-ammonium fluoroacetate
1-difluoromethyl-2,6,7-trioxabicyclo[2.2.2]octyl-4-ammonium difluoroacetate
1-trifluoromethyl-2,6,7-trioxabicyclo[2.2.2]octyl-4-ammonium trifluoroacetate The novel derivatives of 2,6,7-trioxabicyclo[2.2.2]octane of this invention are in general, liquid or solid compounds, the solids melting at low or moderate temperatures. They are stable at normal atmospheric conditions of temperature and pressure and can be readily prepared and stored without special precautions for future use. The compounds of the invention are found to have herbicidal activity. For example, the compounds of the invention have been found to be useful in controlling the growth of certain grasses and broad-leaf plants.

The compounds of the invention can be variously prepared. The organo derivatives of 4-amino-2,6,7-trioxabicyclo[2.2.2]octane where R in the formula shown hereinabove is hydrogen or a $C_1$ to $C_8$ alkyl group, for example, are prepared by reacting 2-amino-2-hydroxymethyl-1,3-propanediol with the appropriate trimethoxy alkane. Examples of suitable trimethoxy alkanes are trimethoxymethane
1,1,1-trimethoxyethane
1,1,1-trimethoxypropane
1,1,1-trimethoxybutane
1,1,1-trimethoxypentane
1,1,1-trimethoxyhexane
1,1,1-trimethoxyheptane
1,1,1-trimethoxyoctane
1,1,1-trimethoxynonane The reaction between the trimethoxy alkane and 2-amino-2-hydroxymethyl-1,3-propanediol is illustrated by the following equation:

$$R-C(OCH_3)_3 + (HOCH_2)_3C-NH_2 \longrightarrow$$

$$R-C \underset{O-CH_2}{\overset{O-CH_2}{\underset{\diagdown}{\diagup}}} C-NH_2 + 3CH_3OH$$

where R is hydrogen or an alkyl group containing from 1 to 8 carbon atoms. The reaction between the trimethoxy alkane and 2 - amino - 2-hydroxymethyl-1,3-propanediol can be conducted either in the presence or in the absence of an inert organic solvent. When a solvent is used, it is preferably one which has a boiling point higher than the boiling point of methanol which is formed in the reaction. Also, the solvent is preferably one which forms a constant boiling mixture with methanol. Suitable solvents include cyclohexane, benzene, toluene, xylene, trichloroethane, dichloropropane, m- and p-dioxane, carbon tetrachloride and the like. The reaction is continued under refluxing conditions until the theoretical amount of alcohol is released. The reaction mixture may be filtered to remove undesired solids and then stripped of solvent if a solvent is used. The product recovered after removal of the solvent can be purified according to known techniques including solvent extraction, filtration, recrystallization, sublimation, or the like, dependent upon the nature of the particular compound.

The aryl derivatives of 4-amino-2,6,7-trioxabicyclo[2.2.2]octane are prepared by reacting 2-amino-2-hydroxymethyl-1,3-propanediol with the appropriate trimethyl orthoester of the aryl carboxylic acid. Examples of suitable orthoesters are trimethyl orthobenzoate and trimethyl orthonaphthoate. The reaction between 2-amino-2-hydroxymethyl-1,3-propanediol and the trimethyl orthoester of an aryl carboxylic acid is illustrated by the equation $$R-C(OCH_3)_3 + (HOCH_2)_3C-NH_2 \longrightarrow$$

$$R-C \underset{O-CH_2}{\overset{O-CH_2}{\underset{\diagdown}{\diagup}}} C-NH_2 + 3CH_3OH$$

where R is an aryl group such as phenyl and naphthyl radicals.

The aralkyl derivatives of 4-amino-2,6,7-trioxabicyclo-[2.2.2]octane are prepared by reacting 2-amino-2-hydroxymethyl-1,3-propanediol with the appropriate 1,1,1-trimethoxyarylalkane. Examples of suitable 1,1,1-trimethoxyarylalkanes are 1,1,1-trimethoxy-2-phenylethane, 1,1,1-trimethoxy-3-phenylpropane and 1,1,1-trimethoxy-2-(p-tolyl)ethane. The reaction between 2-amino-2-hydroxymethyl-1,3-propanediol and the 1,1,1-trimethoxyarylalkane is illustrated by the equation

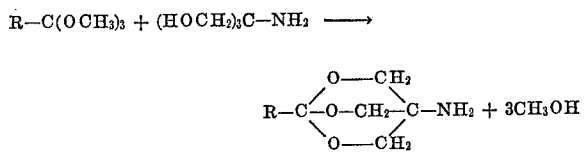

where R is an aralkyl group such as benzyl and phenethyl radicals.

The alkaryl derivatives of 4-amino-2,6,7-trioxabicyclo-[2.2.2]octane are prepared by reacting 2-amino-2-hydroxymethyl-1,3-propanediol with the appropriate α,α,α-trimethoxyarylmethanes. Examples of suitable, α,α,α-trimethoxyarylmethanes are α,α,α - trimethoxy - o - xylene, α,α,α-trimethoxy-m-xylene, α,α,α-trimethoxy-p-xylene and α,α,α-trimethoxymesitylene. The reaction between 2-amino-2-hydroxymethyl-1,3-propanediol and the α,α,α-trimethoxyarylmethanes is illustrated by the equation

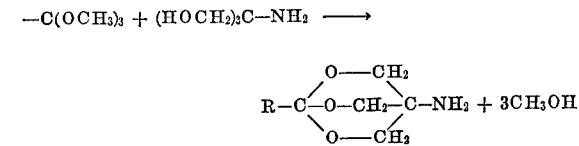

where R is an alkaryl group such as tolyl and xylyl radicals.

The cycloalkyl derivatives of 4-amino-2,6,7-trioxabicyclo[2.2.2]octane are prepared by reacting 2-amino-2-hydroxymethyl-1,3-propanediol with the appropriate cycloalkyltrimethoxymethane. Examples of suitable cycloalkyltrimethoxymethanes are cyclopropyltrimethoxymethane, cyclobutyltrimethoxymethane, cyclopentyltrimethoxymethane and cyclohexyltrimethoxymethane. The reaction between 2-amino-2-hydroxymethyl-1,3-propanediol and cycloalkyltrimethoxymethanes is illustrated by the equation

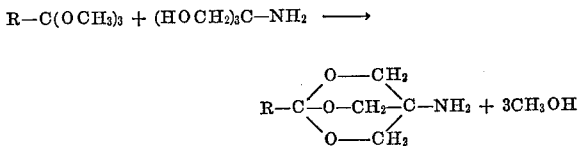

where R is a cycloalkyl group such as cyclopropyl, cyclohexyl and cyclooctyl radicals.

The fluoroacetic acid salt derivatives of 1-fluoromethyl-4 - amino - 2,6,7 - trioxabicyclo[2.2.2]octane are similarly prepared. The trifluoroacetic acid salt of 1-trifluoromethyl - 4 - amino - 2,6,7-trioxabicyclo[2.2.2]octane, for example, can be prepared by reacting 2-amino-2-hydroxymethyl-1,3-propanediol with trifluoroacetic acid. The reaction is illustrated by the following equation:

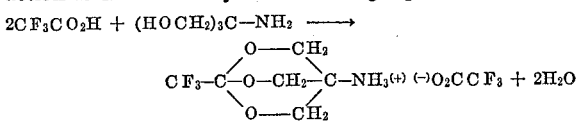

The organo derivatives of 4-benzamido-; 4-(p-nitrobenzamido)-; 4-(2′,4′-dinitrobenzamido)-; 4-(p-chlorobenzamido)-; 4-(2′,4′ - dinitrobenzamido)-; 4-(p-chloro-ido- and 4-arylureido-2,6,7-trioxabicyclo [2.2.2]octane are prepared by reacting the parent 4-amino 2,6,7-trioxabicyclo[2.2.2]octane with appropriate reagents.

4-benzamido derivatives are prepared by reacting the appropriate benzoyl chloride with the 4-amino-2,6,7-trioxabicyclo[2.2.2] octane in the presence of a basic material such as pyridine, triethylamine, sodium hydroxide and the like. The reaction between the benzoyl chloride and the 4-amino-2,6,7-trioxabicyclo[2.2.2]octane is illustrated by the equation

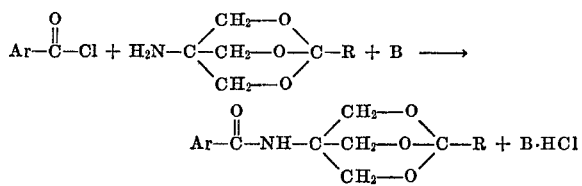

where Ar represents a phenyl, chlorophenyl, dichlorophenyl, nitrophenyl or dinitrophenyl radical; R is selected from the group consisting of hydrogen, alkyl, aryl, aralkyl, alkaryl and cycloalkyl radicals defined hereinabove and B is a basic material such as pyridine, triethylamine, sodium hydroxide and the like. Examples of suitable benzoyl chloride reactants are benzoyl chloride; p-chlorobenzyl chloride; 2,4-dichlorobenzoyl chloride; p-nitrobenzoyl chloride and 2,4-dinitrobenzoyl chloride.

4-acetamido derivatives are prepared by reacting the appropriate 4-amino-2,6,7-trioxabicyclo[2.2.2]octane with acetyl chloride in the presence of a basic material such as pyridine, triethylamine, sodium hydroxide, etc. The reaction between acetyl chloride and the 4-amino-2,6,7-trioxabicyclo[2.2.2]octanes is illustrated by the equation

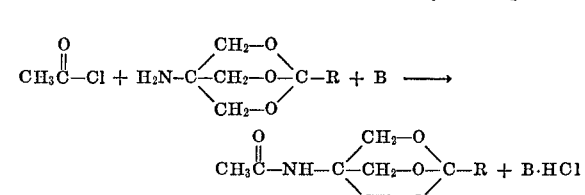

where R is selected from the group consisting of hydrogen, alkyl, aryl, aralkyl, alkaryl and cycloalkyl radicals defined hereinabove and B is a basic material as defined hereinabove.

Substituted 4-ureido derivatives are prepared by reacting the appropriate isocyanate with the 4-amino-2,6,7-trioxabicyclo[2.2.2]octane in the presence of a catalyst such as dibutyltin dilaurate. The reaction between the isocyanate and the 4-amino-2,6,7-trioxabicyclo[2.2.2]octane is illustrated by the equation

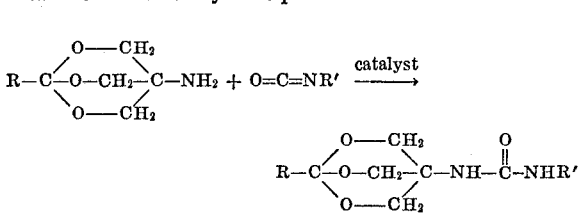

where R is selected from the group consisting of hydrogen, alkyl, aryl, aralkyl, alkaryl and cycloalkyl radicals as defined hereinabove and R′ is selected from the group consisting of alkyl, aryl and cycloalkyl radicals as defined hereinabove. Examples of suitable isocyanate reactants are methyl isocyanate, ethyl isocyanate, propyl isocyanate, butyl isocyanate, hexyl isocyanate, octyl isocyanate, phenyl isocyanate, naphthayl isocyanate and cyclohexyl isocyanate.

The general procedure used in preparing unsubstituted 4-amino compounds of the invention is to place the reactants and solvent, if used, in a suitable reaction vessel, and heat the mixture to drive off the alcohol or water formed during the reaction either as an azeotrope formed with the solvent, or as an alcohol or water fraction if no solvent is used. After all the alcohol or water is removed, the product is filtered and any solvent remaining is driven off by distillation. The product is thereafter purified by conventional purification procedures.

The following examples illustrate specific procedures by which compounds of the invention can be prepared.

EXAMPLE I 1-methyl-4-amino-2,6,7-trioxabicyclo[2.2.2]octane

A mixture of 12.1 grams (0.1 mole) of 2-amino-2-hydroxymethyl-1,3-propanediol and 12.0 grams (0.1 mole) of methyl orthoacetate is stirred and heated in a flask connected to a column for fractional distillation. The temperature of the mixture is increased slowly while methanol, formed in the reaction, is removed by distillation. After heating the mixture for about 6 hours, the temperature reaches about 140° C. at which point no additional methanol appears to evolve. The theoretical amount of methanol formed in the reaction is 9.6 grams (0.3 mole). The crude crystalline product obtained when the flask is cooled is purified by sublimation at 80° to 90° C. and 0.2 mm. of mercury pressure. The purified white crystalline solid (10.5 grams) has a melting point of 91° to 93° C. The yield is about 72.4% of the theoretical yield. Elemental analysis of the product shows it to compare favorable with the theoretical analysis of 1-methyl-4-amino-3,6,7-trioxabicyclo[2.2.2]octane.

|          | Percent by weight [1] | |
|----------|-------|-------------|
|          | Found | Theoretical |
| Carbon   | 49.93 | 49.65       |
| Hydrogen | 7.61  | 7.64        |

[1] For 1-methyl-4-amino-2,6,7-trioxabicyclo[2.2.2]octane.

EXAMPLE II 1-trifluoromethyl-2,6,7-trioxabicyclo[2.2.2]octyl-4-ammonium trifluoroacetate A mixture of 22.8 grams (0.2 mole) of trifluoroacetic acid and 12.1 grams (0.1 mole) of 2-amino-2-hydroxymethyl-1,3-propanediol dispersed in 100 milliliters of benzene is stirred and refluxed at about 80° C. in a flask connected to a reflux condenser by means of a Dean-Stark trap. Refluxing is continued with a benzene-water azeotrope being collected in the trap. After 24 hours, a total of about 6 milliliters of water is collected. Refluxing is thereafter continued for an additional 8 hours. The reaction mixture is cooled whereupon a white crystalline solid precipitates. The solid is isolated and recrystallized from methyl isopropyl ketone. The purified white crystalline solid (8.4 grams) has a melting point of 108° C. Elemental analysis of the product shows it to compare favorably with the theoretical analysis of 1-trifluoromethyl-2,6,7-trioxabicyclo[2.2.2]octyl-4-ammonium trifluoroacetate.

|          | Percent by weight [1] | |
|----------|-------|-------------|
|          | Found | Theoretical |
| Carbon   | 31.21 | 30.70       |
| Hydrogen | 3.30  | 2.88        |

[1] 1-trifluoromethyl-2,6,7-trioxabicyclo[2.2.2]octyl-4-ammonium trifluoroacetate.

EXAMPLE III

N-(N'-methylcarbamyl)-4-amino-1-methyl-2,6,7-trioxabicyclo[2.2.2]octane 4-amino-1-methyl-2,6,7-trioxabicyclo[2.2.2]octane (7.3 g., 0.05 mole) is dissolved in 325 ml. of 1,2-dimethoxyethane. Methyl isocyanate (3.4 g., 0.06 mole), and dibutylin dilaurate (5 drops) are added. The mixture is stirred to form a homogeneous solution. The solution is let stand for 18 hours. The solvent is removed under reduced pressure. The residue is a clear, colorless, viscous liquid. The yield of crude product is 10 grams. Elemental analysis of the product shows it to compare favorably with the theoretical analysis of N-(N'-methylcarbamyl)-4-amino - 1 - methyl - 2,6,7 - trioxabicyclo[2.2.2]octane.

|          | Percent by weight [1] | |
|----------|-------|-------------|
|          | Found | Theoretical |
| Carbon   | 46.55 | 47.52       |
| Hydrogen | 7.78  | 6.98        |

[1] For N-(N'-Methylcarbamyl-4-amino-1-methyl-2,6,7-trioxabicyclo[2.2.2]octane.

EXAMPLE IV 1-methyl-4-benzamido-2,6,7-trioxabicyclo[2.2.2]octane

4 - amino - 1 - methyl-2,6,7-trioxabicyclo[2.2.2]octane (7.3 g., 0.05 mole) and triethylamine (7.0 g., 0.07 mole) are dissolved in 150 ml. of dry ether. Benzoyl chloride (7.0 g., 0.05 mole) is added dropwise. The mixture is refluxed for four hours. The reaction mixture is cooled and filtered. Solvent is stripped from the filtrate under reduced pressure. The residue is partially purified by sublimation at reduced pressure. The yield is 5.2 g. of crude product.

EXAMPLE V 1-methyl-4-(p-nitrobenzamido)-2,6,7-trioxabicyclo[2.2.2]octane

4 - amino - 1 - methyl-2,6,7-trioxabicyclo[2.2.2]octane (10.2 g., 0.07 mole) and triethylamine (10.1 g., 0.1 mole) are dissolved in 150 ml. of dry benzene. A solution of 15.5 g. (0.08 mole) of p-nitrobenzoyl chloride in 100 ml. of benzene is added dropwise. The mixture is refluxed for one hour. The mixture is filtered. The filtrate is concentrated to dryness. The crude product is recrystallized from benzene to yield 6.0 g. of white crystalline solid, melting at 145° C. Elemental analysis of the product shows it to compare favorably with the theoretical analysis of 1-methyl-4-(p-nitrobenzamido)-2,6,7-trioxabicyclo[2.2.2]octane.

|          | Percent by weight [1] | |
|----------|-------|-------------|
|          | Found | Theoretical |
| Carbon   | 53.67 | 53.06       |
| Hydrogen | 5.44  | 4.80        |
| Nitrogen | 9.01  | 9.50        |

[1] For 1-methyl-4-(p-nitrobenzamido)-2,6,7-trioxabicyclo[2.2.2]octane.

EXAMPLE VI 1-methyl-4-(2',4'-dichlorobenzamido)-2,6,7-trioxabicyclo[2.2.2]octane 4-amino-1-methyl-2,6,7-trioxabicyclo[2.2.2]octane (7.3 g., 0.05 mole) and triethylamine (7.6 g., 0.075 mole) are dissolved in 150 ml. of toluene. 2,4-dichlorobenzoyl chloride (10.5 g., 0.05 mole) is added dropwise. The mixture is refluxed for two hours. The mixture is filtered. Solvent is stripped from the filtrate under reduced pressure. The residue is recrystallized from ether. The yield is 4.3 g. of white solid, melting at 99° C. Elemental analysis of the product shows it to compare favorably with the theoretical analysis of 1-methyl-4-(2',4'-dichlorobenzamido)-2,6,7-trioxabicyclo[2.2.2]octane.

|  | Percent by weight [1] | |
|---|---|---|
|  | Found | Theoretical |
| Carbon | 48.66 | 49.08 |
| Hydrogen | 4.06 | 4.12 |

[1] For 1-methyl-4-(2',4'-dichlorobenzamido)-2,6,7-trioxabicyclo[2.2.2]octane.

The 2,6,7-trioxabicyclo[2.2.2]octane compounds of this invention possess herbicidal activity of a high level. For this reason it is desirable to employ an inert carrier with the 2,6,7-trioxabicyclo[2.2.2]octane compounds. The compounds may be applied in the form of a spray or a granular solid. When utilized in the form of a spray, the compounds may be dispersed in water along with such auxiliary agents as solvents and surface active agents such as emulsifiers, dispersants or penetrants. When used as a solid, the compounds of the invention may be used in conjunction with kaolin to prevent caking and may be compounded with clays, powdered chalk and other suitable solids as inert carriers and pelletized, if desired, to yield granular solid formations. In preparing formulations of this type it is preferred to use a solvent so as to obtain thorough, even distribution on the inert solid. Other suitable carriers include finely-divided talcs and synthetic mineral fillers derived from silica and silicates, for example, synthetic fine silica and synthetic calcium and magnesium silicates. Also magnesium and calcium carbonates can be used.

The amount of active ingredient applied to the area to be protected is sufficient to exert the desired herbicidal action. Different amounts of the active ingredient are suitably applied to achieve a desired result depending upon the extent and nature of weed growth, application procedures and other features. In most instances, effective herbicidal action can be obtained by applying the active compound at a rate of about 1 to about 10 pounds per acre, preferably about 1 to about 5 pounds per acre in most applications. The formulations utilized may contain from 0.5 percent to about 90 percent by weight of active ingredient, depending upon the particular results desired, the method and place of application.

The organic liquids which can be used in preparing aqueous solutions, suspensions or emulsions of the 2,6,7-trioxabicyclo[2.2.2]octane compounds of the invention include light petroleum fractions such as deodorized naphthas and kerosenes; lubricating oils of light viscosity; aromatic hydrocarbons such as benzene, toluene, xylene and alkyl naphthalenes such as α-methyl naphthalene; alcohols such as ethanol, propanol and butanol; ketones such as acetone, methyl ethyl ketone and cyclohexanone; ethers such as isopropyl ether; and halogenated compounds such as carbon tetrachloride, ethylene dichloride and tetrachloroethane. In certain instances, it is advantageous to employ a mixture of organic liquids as the extending agent.

When the 2,6,7-trioxabicyclo[2.2.2]octane compound of the invention is supplied as an aerosol, it is convenient to dissolve it in a suitable solvent and disperse the resulting solution in dichlorodifluoromethane or similar chlorofluoroalkane which boils below room temperature at atmospheric pressure. While compounds of the invention, particularly those with a free—$NH_2$ group are effective post-emergent herbicides, it will be understood that the compounds are not all equally effective. Also, some compounds are effective in inhibiting the growth of some plants while other compounds are effective in inhibiting the growth of other plants. In the pre-emergence and post-emergence tests reported hereinbelow, it will be noted that the 4-amino-1-methyl compound is more effective in controlling broad-leaf plants, i.e., soybean, cotton, alfalfa, sugar beet and tomato plants. The trifluoromethyl compound is more effective against the grasses, i.e., crabgrass, millet, brome and corn.

In order to illustrate pre-emergent and post-emergent herbicidal activity, aqueous dispersions of the compound to be tested are applied to various crops. The dispersions comprise water as the principal inert carrier, along with such auxiliary agents as solvents and surface active agents such as emulsifiers, dispersants or penetrants. The following formulation is representative of the water-dispersible type suitable for spray application: 10% active ingredient, 30% solvent (approximately 50% xylene and 50% kerosene), and 55% emulsifier (for example Emulphor EL-719, a polyoxyethylated vegetable oil). About 4 to 5 parts of this emulsifiable concentrate are mixed with about 35 parts of water to produce an aqueous dispersion for spray application.

Aqueous dispersions of 4-amino-1-methyl-2,6,7-trioxabicyclo[2.2.2]octane prepared as described above were tested on plants from 10 to 18 days after emergence at application rates of 1 and 2 pounds of active ingredient per acre and a spray volume of 60 gallons per acre. Seven days after treatment the plants were observed. The results are shown in Table I.

TABLE I
4-amino-1-methyl-2,6,7-trioxabicyclo[2.2.2]octane as a post-emergent herbicide

| Rate of application, lbs/a. | Plant tested | Effect [1] |
|---|---|---|
| 2 | Millet | N4 |
| 1 | do | N3, G2 |
| 2 | Soybean | N3, G3 |
| 1 | do | N3, G2 |
| 2 | Cotton | N4 |
| 1 | do | N4 |
| 2 | Alfalfa | N4 |
| 1 | do | N3, G2 |
| 2 | Oats | N1 |
| 1 | do | 0 |
| 2 | Corn | N1, G1 |
| 1 | do | N1, G1 |
| 2 | Flax | N2, G2 |
| 1 | do | N1, G1 |
| 2 | Radish | N2, G2 |
| 1 | do | N1, G1 |
| 2 | Sugar beet | N4 |
| 1 | do | N3, G3 |
| 2 | Wheat | N1, G1 |
| 1 | do | N1 |
| 2 | Grain sorghum | N2, G2 |
| 1 | do | N2, G1 |
| 2 | Tomato | N3, G3 |
| 1 | do | N3, G3 |

[1] N=Necrosis; G=growth inhibition; 0=no effect; 1=0–25% of foliage; 2=26–75% of foliage; 3=76–99% of foliage; 4=dead plants.

As evidenced by the data in Table I, 4-amino-1-methyl-2,6,7-trioxabicyclo[2.2.2]octane is useful for post-emergence treatment of certain crops. For example, it will be noted that the compound has no effect on oats when used at a rate of 1 pound per acre. When applied at the same rate to cotton plants, the plants are completely eliminated. It will be noted further that at the rate of 2 pounds per acre, millet, cotton, alfalfa and sugar beets are completely eliminated.

Aqueous dispersions of 1 - trifluoromethyl-2,6,7-trioxabicyclo[2.2.2]octyl-4-ammonium trifluoroacetate prepared as described above were tested for their pre-emergence action on various plants. In the pre-emergence test, disposable paper half-flats were seeded and sprayed with the aqueous dispersion at application rates of 5 and 10 pounds of active ingredient per acre. One half-flat was seeded with alfalfa, oats, corn, flax, radishes and sugar beets. This flat was held at 75° F. Another half-flat was seeded with crabgrass, coxcomb, brome, millet, soybeans and cotton. This flat was held at 85° F. The results of the pre-emergence treatment are shown in Table II.

TABLE II 1-trifluoromethyl-2,6,7,-trioxabicyclo[2.2.2]octyl-4-ammonium trifluoroacetate as a pre-emergence herbicide

| Plant tested | Effect[1] |
|---|---|
| Rate of application, lbs./a.: | |
| 10 Crabgrass | F3, G3 |
| 5 do | F2, G2 |
| 10 Coxcomb | N1, G1 |
| 5 do | 0 |
| 10 Brome | K4 |
| 5 do | G2 |
| 10 Millet | N3, G3 |
| 5 do | F3, G3 |
| 10 Soybean | F1 |
| 5 do | G1 |
| 10 Cotton | 0 |
| 5 do | 0 |
| 10 Alfalfa | F1 |
| 5 do | 0 |
| 10 Oats | N1, G1 |
| 5 do | 0 |
| 10 Corn | F3, G3 |
| 5 do | F1, G1 |
| 10 Flax | 0 |
| 5 do | 0 |
| 10 Radish | 0 |
| 5 do | 0 |
| 10 Sugar beet | 0 |
| 5 do | 0 |

[1] F=Formative effects; G=growth inhibition; K=non-emergence; N=necrosis; 0=no effect; 1=some effect; 2=medium effect; 3=severe effect; 4=maximum effect.

As evidenced by the data in Table II, 1-trifluoromethyl-2,6,7 - trioxabicyclo[2.2.2]octyl - 4 - ammonium trifluoroacetate is particularly useful for pre-emergence control of brome, crabgrass and millet. While oats, alfalfa and coxcomb were slightly affected by the compound at a rate of 10 pounds per acre, these plants were not affected by the compound at 5 pounds per acre. The compound had no effect on cotton, flax, radish or sugar beets even at 10 pounds per acre. Thus, the trifluoromethyl compound is particularly valuable as a pre-emergence herbicide to prevent grass growth in fields of cotton, flax, radishes and sugar beets. Various special applications of compounds of the invention may be suggested to those who are skilled in the art.

What is claimed is:

1. A 2,6,7-trioxabicyclo[2.2.2]octane compound represented by the formula

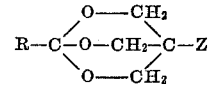

wherein R is selected from the group consisting of hydrogen, $C_nH_{2n+1}$-, $C_6H_5$-, $C_{10}H_7$-, $C_6H_5(CH_2)_n$-, $CH_3C_6H_4$-, $(CH_3)_2C_6H_3$-, $C_mH_{2m-1}$- and $F_xCH_{3-x}$- radicals; Z is selected from the group consisting of amino and ammonium fluoroacetate radicals; $h$ is an integer of 3 to 8; $n$ is an integer of 1 to 8; and $x$ is an integer of 1 to 3.

2. 1-methyl - 4 - amino - 2,6,7 - trioxabicyclo[2.2.2]octane.

3. 1 - trifluoromethyl - 2,6,7-trioxabicyclo[2.2.2]octyl-4-ammonium trifluoroacetate.

References Cited

UNITED STATES PATENTS

| 2,527,078 | 10/1950 | Tucker | 260—340.7 |
| 3,328,427 | 6/1967 | Melaas | 260—340.7 |

ALEX MAZEL, Primary Examiner

J. H. TURNIPSEED, Assistant Examiner

U.S. Cl. X.R.

71—88

PO-1050
(5/69)

UNITED STATES PATENT OFFICE
CERTIFICATE OF CORRECTION

Patent No. 3,686,224               Dated  August 22, 1972

Inventor(s)   John F. Deffner

It is certified that error appears in the above-identified patent and that said Letters Patent are hereby corrected as shown below:

Column 1, line 54, "acetamido[$CH_6H_5CONH-$];" should read
-- acetamido[$CH_3CONH$]; --.

Column 5, line 31, at the beginning of the formula "-C" should
read -- R-C --;

Column 5, line 75 and line 1 in Column 6,
"4-(2',4'-dinitrobenzamido)-; 4-(p-chloroido-"
should read -- 4-(2',4'-dichlorobenzamido)-;
4-alkylureido --.

Column 6, line 72, "naphthayl" should read -- naphthyl --.

Column 12, line 17, "h" should read -- m --.

Signed and sealed this 9th day of Janury 1973.

(SEAL)
Attest:

EDWARD M.FLETCHER,JR.                ROBERT GOTTSCHALK
Attesting Officer                    Commissioner of Patents